United States Patent
Conrad et al.

(10) Patent No.: US 10,037,242 B2
(45) Date of Patent: Jul. 31, 2018

(54) FAILURE DETECTION IN A PROCESSING SYSTEM

(71) Applicant: Microsoft Technology Licensing, LLC, Redmond, WA (US)

(72) Inventors: Lennart Conrad, Skovlunde (DK); Per Lykke Lynnerup, Herlev (DK); Philip Raymond Winstead, Westfield, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/189,237

(22) Filed: Jun. 22, 2016

(65) Prior Publication Data

US 2017/0371737 A1 Dec. 28, 2017

(51) Int. Cl.
*G06F 11/00* (2006.01)
*G06F 11/07* (2006.01)
*G06F 9/52* (2006.01)

(52) U.S. Cl.
CPC .......... *G06F 11/0793* (2013.01); *G06F 9/526* (2013.01); *G06F 11/079* (2013.01); *G06F 11/0721* (2013.01); *G06F 11/0751* (2013.01)

(58) Field of Classification Search
CPC ............. G06F 11/0709; G06F 11/0751; G06F 11/079; G06F 11/0793
See application file for complete search history.

(56) References Cited

U.S. PATENT DOCUMENTS

| | | | |
|---|---|---|---|
| 6,289,474 B1 | 9/2001 | Beckerle | |
| 6,332,167 B1 | 12/2001 | Peters et al. | |
| 6,546,403 B1 | 4/2003 | Carlson et al. | |
| 7,739,244 B2 | 6/2010 | Verma et al. | |
| 8,231,471 B2* | 7/2012 | Blackburn | G07F 17/323 463/24 |
| 8,352,448 B2 | 1/2013 | Haye et al. | |
| 8,578,218 B2 | 11/2013 | Singh et al. | |
| 8,838,534 B2 | 9/2014 | Fowler | |
| 9,104,566 B2 | 8/2015 | Sutterfield et al. | |
| 2006/0048155 A1* | 3/2006 | Wu | G06F 9/4843 718/101 |

(Continued)

FOREIGN PATENT DOCUMENTS

| | | |
|---|---|---|
| CN | 101446906 | 6/2009 |
| CN | 104123654 A | 10/2014 |
| WO | 2000023890 A1 | 4/2000 |

OTHER PUBLICATIONS

"Supply Chain Integrity", in White Paper of Movilitas and Honeywell, May 13, 2016, 21 pages.

(Continued)

*Primary Examiner* — Charles Ehne
(74) *Attorney, Agent, or Firm* — Christopher J. Volkmann; Kelly, Holt & Christensen, PLLC

(57) ABSTRACT

A first processor enters a control record in a database and then selects the control record and locks it with a pessimistic lock. If the first processor finishes its operations, it deletes the control record. A subsequent processor searches for the control record and attempts to lock it with a pessimistic lock. If the subsequent processor is successful in locking the control record, it determines that the first processor has failed in performing its process, and takes desired action.

19 Claims, 5 Drawing Sheets

(56) References Cited

U.S. PATENT DOCUMENTS

| | | | | |
|---|---|---|---|---|
| 2007/0214457 A1* | 9/2007 | Goyal | ............... | G06F 11/1438 |
| | | | | 718/101 |
| 2008/0005111 A1 | 1/2008 | Savage | | |
| 2009/0235126 A1* | 9/2009 | Hosouchi | ............ | G06F 11/0727 |
| | | | | 714/57 |
| 2016/0182331 A1* | 6/2016 | Iannaccone | ............ | G06Q 10/06 |
| | | | | 709/224 |

OTHER PUBLICATIONS

Rabeler, et al., "How to use batching to improve SQL Database application performance", Retrieved on: May 13, 2016 Available at: https://azure.microsoft.com/en-gb/documentation/articles/sql-database-use-batching-to-improve-performance/.

"Spring Batch Introduction", Published on: June 9, 2014 Available at: http://docs.spring.io/spring-batch/trunk/reference/html/spring-batch-intro.html.

https://www.researchgate.net/profile/Suk_Yoo2/publication/221002512_A_mechanism_for_automatic_object_locking_in_C-based_object-oriented_databases/links/00b4952b7bfab4af4c000000.pdf. Jan. 1996, 9 pages.

* cited by examiner

FAILURE DETECTION IN A PROCESSING SYSTEM

BACKGROUND

Computer systems are currently in wide use. Some computer systems can be configured to operate in a multi-processor, batch processing mode in which one or more operations (or steps or tasks) are performed in a set (or batch).

In addition, some computing systems operate in a parallel, batch processing configuration. In this type of configuration, a first set of processors (which can be distributed in a distributed architecture) operate in parallel to perform a first batch of operational steps or tasks or operate on a first batch of inputs. In addition, a second set of processors may operate in parallel to perform a second batch of operational steps or tasks or operate on a second batch of inputs.

In still other configurations, the parallel, batch processing is performed in waves. In a wave-type configuration, the results of performing the steps or tasks on a first batch of steps or tasks in a first wave of processing may influence the results of performing steps or tasks on the subsequent batch in a subsequent wave of processing. Thus, a first wave may include the operation of a first set of processors operating on a first batch. A subsequent wave of processing may include the operation of a subsequent set of processors on a subsequent batch. The results obtained by the first set of processors operating on the first batch in the first wave may influence the results of the operation of the subsequent set of processors operating on the subsequent batch in the subsequent wave.

In all of these types of architectures, it can also be difficult for one processor in the multi-processor architecture to determine whether another processor has catastrophically (or ungracefully) failed when performing a process. By a catastrophic or ungraceful failure it is meant that the failed processor, itself, is unable to generate an exception or error indicating that it has failed. Such a failure may occur, for instance, when power is disrupted to the processor, when the processor is physically or electronically damaged, or for a wide variety of other reasons.

The discussion above is merely provided for general background information and is not intended to be used as an aid in determining the scope of the claimed subject matter.

SUMMARY

A first processor enters a control record in a database and then selects the control record and locks it with a pessimistic lock. If the first processor finishes its operations, it deletes the control record. A subsequent processor searches for the control record and attempts to lock it with a pessimistic lock. If the subsequent processor is successful in locking the control record, it determines that the first processor has failed in performing its process, and takes desired action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

It should first be noted that, while the present discussion proceeds with respect to parallel, wave processing, the processing need not be performed in parallel, in each wave. Instead, the batch in a first wave of processing may include only a single step or data item to be processed. That being the case, in the first wave of processing, a single wave processor instance may perform the single step or performing an operation on a single data record. Also, in a subsequent wave of processing a single wave processor instance may perform a single step, or an operation on a single data record. Thus, while the architecture in FIG. 1 and the corresponding discussion describe a parallel, wave processing scenario, where each wave includes multiple processor instances performing processing on a batch in parallel, this is by way of example only.

Figure 1:
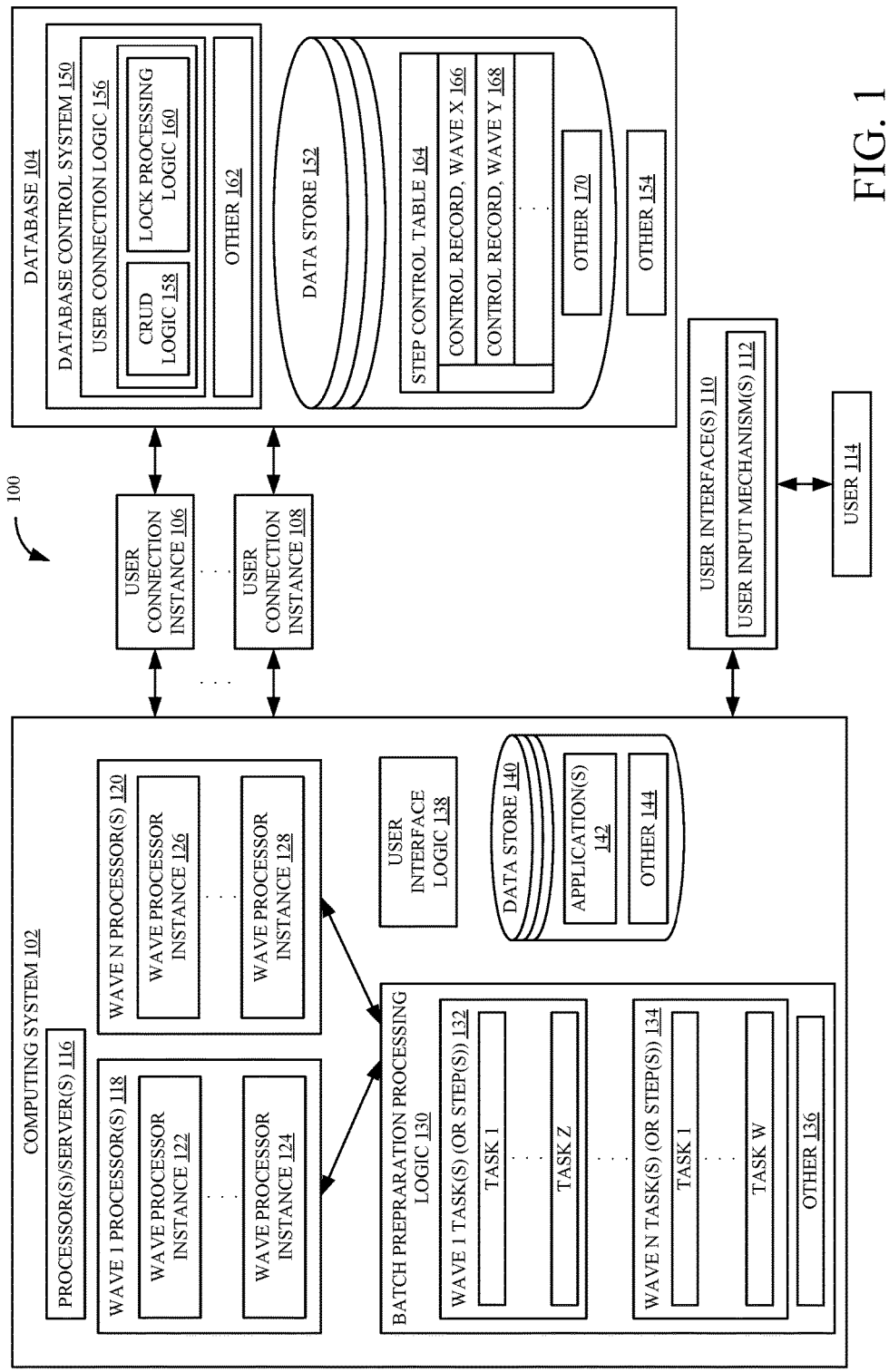
FIG. 1 is a block diagram of one example of a computing system architecture (such as a wave parallel processing architecture).

FIG. 1 is a block diagram of one example of a computing system architecture (such as a wave parallel processing architecture) 100. Architecture 100 includes computing system 102 connected to database 104 through a plurality of user connections 106-108. Architecture 100 also shows that, in one example, computing system 102 can generate user interfaces 110 with user input mechanisms 112 for interaction by user 114. User 114 can illustratively interact with user input mechanisms 112 in order to control and manipulate computing system 102.

In the example shown in FIG. 1, computing system 102 illustratively includes one or more processors or servers 116. FIG. 1 also shows that computing system 102 includes a plurality of different sets of wave processor instances. FIG. 1 illustrates a set of wave 1 processor instances 118 and a set of wave n processor instances 120. Each set 118-120 of wave processor instances includes a plurality of different processor instances. The set of wave 1 processor instances 118 illustratively includes processor instances 122-124. The set of wave n processor instances 120 illustratively includes wave processor instances 126-128.

Each set of wave processor instances performs parallel processing to execute a batch of operations (e.g., a batch of tasks or steps or operations on a batch of data records). The wave processor instances perform those parallel operations in waves of processing. The waves of processing are arranged sequentially. Therefore, wave processor instances 122-124 perform parallel processing on a first batch (e.g., they perform a first batch of steps or tasks or operate on a first batch of inputs) in a first wave and wave processor instances 126-128 perform parallel processing on another batch in a subsequent wave.

The processor instances 122, 124, 126, and 128 can take many different forms. For instance, they can be separate physical microprocessors and they can be disposed in a distributed computing system architecture in which they exchange messages to coordinate parallel processing, in waves. They can also be separate cores in a multi-core microprocessor, or they can be separate virtual machines controlled by a hypervisor to perform parallel, wave processing. They can be configured in a wide variety of other ways as well.

FIG. 1 also shows that computing system 102 includes batch preparation processing logic 130. Logic 130 illustratively prepares batches of tasks or steps that are performed by (or data records that are operated on by) the sets 118-120 of wave processor instances. For instance, logic 130 can generate a first set of tasks 132 (that include task 1-task z) that are to be performed in a first wave of parallel processing, by the set of wave 1 processor instances. Logic 130 has also prepared, in FIG. 1, a subsequent set of tasks 134 (which comprise task 1-task w) that are to be performed in a subsequent wave of parallel processing, by the set 120 of wave n processor instances. Each task can be a wide variety of different things. For instance, it may be a data record that is operated on by the corresponding processor. It may be an operation that is performed. It may be a user input that is processed by a processor instance, or it may be a wide variety of other items. The tasks can include other items 136 as well.

In one example, performance of the tasks in the first set of tasks or steps 132 may influence the performance of the tasks or steps in the subsequent set 134. For instance, where tasks 1-z in set 132 are items to be allocated to a physical process in a first wave of processing, then once they are allocated, they are no longer available to be allocated in a subsequent wave of processing. Thus, the items allocated in set 132 will not be available to be allocated in set 134. In this way, the tasks or steps in set 134 are dependent on either those included in set 132, or on the results of processing the tasks or steps in set 132, or otherwise.

FIG. 1 also shows that computing system 102 can include user interface logic 138 and data store 140 (which, itself, can store applications 142 and other items 144). User interface logic 138 can generate user interfaces 110 and detect user inputs through user input mechanisms 112. It can notify other items in computing system 102 of those inputs and generate other outputs as well.

Processors or servers 116 (or the various processor instances described herein) may illustratively run applications 144 that incorporate parallel wave processing using processor instances 122-128. By way of example, application 142 may be a warehouse management system in which orders are entered by users 114 and those orders are allocated to a picking process within a warehouse. In such an example, each of the tasks in sets 132-134 may be physical items corresponding to the orders entered by users 114 that are allocated to different picking processes. Thus, the set of tasks 132 may represent physical items in a warehouse that are allocated to a picking process that is performed by a day shift of workers in the warehouse. The set of tasks 134 may correspond to physical items that are assigned to a picking process that is executed in another shift. In that case, the set 118 of wave processor instances will illustratively process the tasks in set 132, in parallel, allocating them to the first picking process. After that, the set 120 of wave processor instances will illustratively process the set of tasks 134, in parallel, allocating them to a subsequent picking process. It will be noted, however, that if one of the items in set 132 fails to be allocated because one of the wave processor instances fails, then that physical item will not be allocated to a picking process by the first wave of processing. Also, however, because it is in the set 132 of tasks, it may not be operated on by the wave processor instances operating in a subsequent wave of parallel processing, either. In some such systems, it can be very difficult for a processor instance in a subsequent wave to determine whether a processor instance in a previous wave has failed, especially if it has failed catastrophically or ungracefully.

Therefore, FIG. 1 also shows that architecture 100 includes database 104. Database 104 can include database control system 150, data store 152, and it can include other items 154. Database control system 150 can, itself, include user connection logic 156, create, read, update, delete (CRUD) logic 158, lock processing logic 160, and it can include other items 162. Data store 152, itself, can include a step control table 164 which includes a set of control records 166-168, and it can include other items 170.

User connection logic 156 illustratively manages the creation and deletion of user connection instances 106-108 that allow processor instances 122-128 to access data in data store 152, through database control system 150. Therefore, a wave processor instance can call database 104 and user connection logic 156 will open a user connection instance for that processor so the processor can conduct operations over that user connection instance. When the processor instance no longer needs the user connection instance 106, it is killed, or ended, or otherwise disabled, by user connection logic 156. Each user connection instance can be an object, an entity, or another connection mechanism that can be called by a processor instance to interact with database 104.

CRUD logic 158 allows wave processor instances 122-128 to perform CRUD operations on data in data store 152 through a user connection instance. Thus, once a user connection instance is associated with a processor instance, the processor instance can create records, read records, update records and delete records in data store 152 using CRUD logic 158.

Lock processing logic 160 performs lock processes when wave processor instances are accessing data in data store 152. For instance, a wave processor instance may select a record (such as control record 166) and lock it using a number of different locks. One such lock is referred to as a "pessimistic" lock. When a processor instance uses lock processing logic 160 to lock control record 166 with a pessimistic lock, that means that the record is locked immediately even before any change is made and it means that other processor instances can access the control record 166, but they cannot update it, delete it, or lock it with a lock that excludes other processor instances from locking it. Also, when a processor instance no longer needs its user connection instance, or when it fails, then user connection logic 156 ends the user connection instance. Lock processing logic 160 detects this and removes any lock that was asserted using that user connection instance. When that happens (e.g., for control record 166), then control record 166 still resides in step control table 164, but it would not have a pessimistic lock applied to it by any wave processor instance, and therefore it could be locked, with a pessimistic lock, by another wave processor instance.

Figure 2:
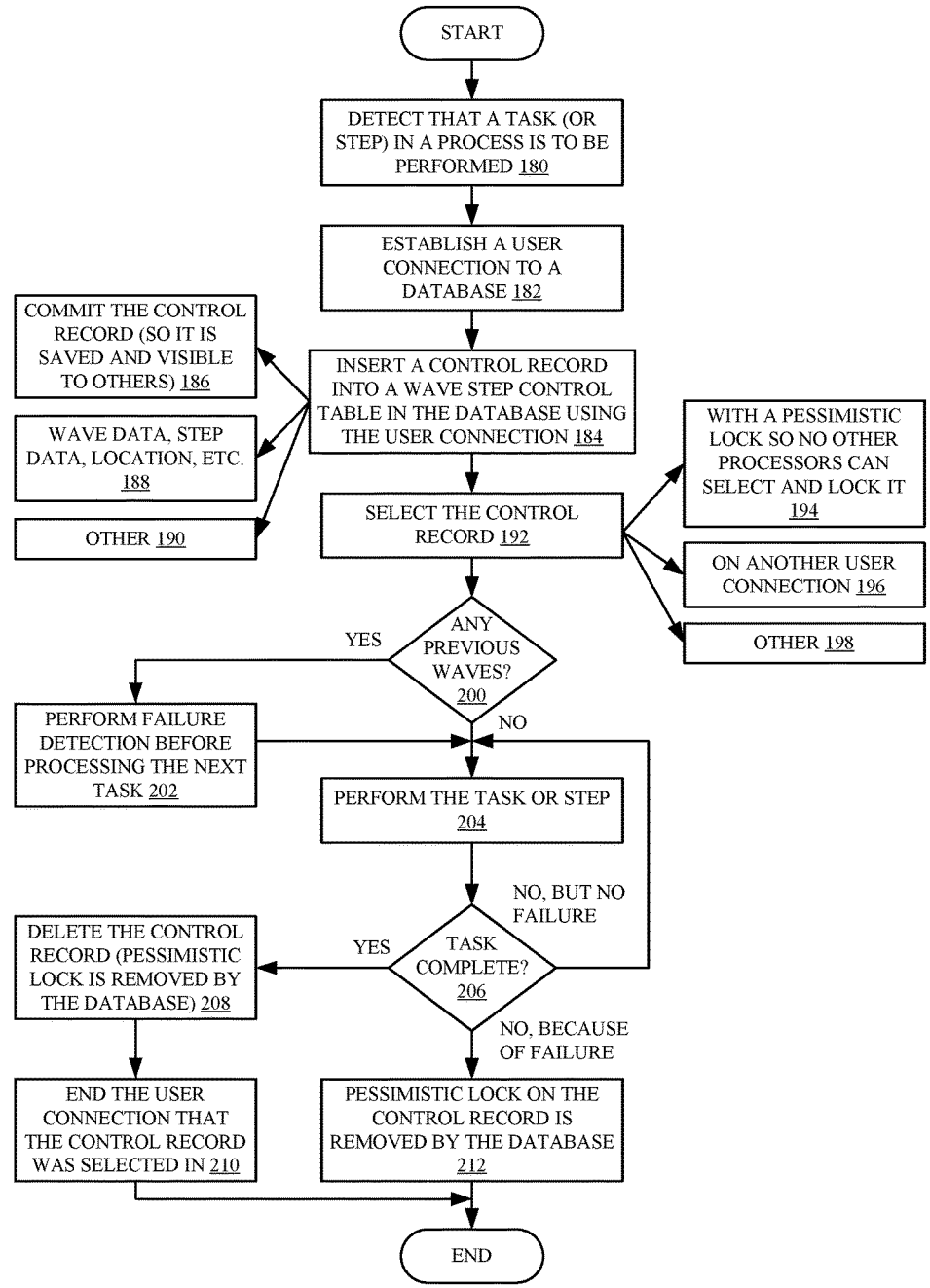
FIG. 2 is a flow diagram illustrating one example of the operation of a processor in the architecture illustrated in FIG. 1.

FIG. 2 shows an example of the operation of one of the wave processor instances (e.g., instance 122) in the set 118 of wave processor instances performing an operation in a first wave of processing. Again, it will be noted that each wave might include only a single processor instance performing one step or task, or operating on one data record. Each wave might also include multiple processor instances performing parallel or batched operations. However, the discussion of FIG. 2 is with respect to one processor instance performing one operation in a first wave of processing.

Therefore, the description applies to a single processor performs in a wave that only includes one step or task. However, it also applies to the operation of a single processor instance in a wave in which multiple processor instances are performing batched operations in parallel (e.g., they are operating on a batch of a plurality of data records or they are performing a batch of multiple operations or steps or tasks, in parallel). The discussion of FIG. 2 applies equally to both.

Wave processor instance 122 first detects that it is to perform a task or step in a process. This is indicated by block 180 in FIG. 2.

Wave processor instance 122 then calls user connection logic 156 in database 104 to establish a user connection to database 104. User connection logic 156 generates a user connection instance 106, which can be an object or another processing item that performs user connection operations between wave processor instance 122 and database control system 150. Establishing the user connection to database 104 is indicated by block 182 in the flow diagram of FIG. 2.

When the user connection instance 106 is established, wave processor instance 122 uses CRUD logic 158 to insert a control record (e.g., control record 166) into step control table 164. This is indicated by block 184 in FIG. 2. In one example, wave processor instance 122 commits the control record as well so that it is saved and visible to other processor instances. This is indicated by block 186.

The control record 166 may include a wide variety of different types of data. For instance, it may include wave data that indicates a particular wave of processing to which it belongs. It may include step data that indicates the particular step or task or data record that it is to operate on. Where the computing system 100 serves a variety of different geographical locations, it may identify the geographical location that it serves. All of this is indicated by block 188. The control record can include other things or be inserted in other ways as well, and this is indicated by block 190.

Wave processor instance 122 then selects the control record 166 in step control table 164. This is indicated by block 192. In one example, it selects it, asserting a pessimistic lock. This causes lock processing logic 160 to lock record 166 immediately and so that no other processors can select and lock it with a pessimistic lock of their own. This is indicated by block 194. In one example, wave processor instance 122 inserts control record 166 on a first user connection instance 106, but then establishes another user connection, through another user connection instance 108, and selects the control record 166 using the second user connection instance 108. This is one example, and it is indicated by block 196 in FIG. 2. The control record can be selected by wave processor instance 122 in other ways as well, and this is indicated by block 198.

Wave processor instance 122 then determines whether there have been any previous waves of processing in this particular set of waves. For instance, it may be that processing starts over every day or every pre-defined time period. It may also be that wave processor instance 122 is performing operations in the first wave of processing for that time period. However, it may be that wave processor instance 122 is performing operations in a wave of processing that follows previous waves. Determining whether any previous waves have been or are being executed is indicated by block 200 in FIG. 2.

If so, then wave processor instance 122 performs failure detection before processing its step or task, in its wave. This is indicated by block 202. This is described in greater detail below with respect to FIG. 3. Briefly, however, it determines whether any wave processor instances in the previous wave failed ungracefully or catastrophically. By this, it is meant that the processor instance failed in a way that it could not, itself, detect its own failure and notify other items in computing system 102, of that failure. Instead, the ungraceful or catastrophic failure may be due to power loss, physical or electronic damage to the processor instance, data corruption in the processor instance, or a wide variety of other reasons.

Either after failure detection is performed at block 202 or, if no previous waves have been or are being executed, then wave processor instance 122 performs the task or step (e.g., step 1) in its set of tasks or steps (e.g., in set 132). This is indicated by block 204 in FIG. 2.

As long as wave processor instance 122 does not fail, it continues to perform its task or step in set 132, until that task or step is complete. This is indicated by block 206. Once the task or step is complete, and assuming that wave processor instance 122 has not failed, then it uses user connection 108 to delete control record 166. In that case, lock processing logic 160 also removes the pessimistic lock on the record as well. This is indicated by block 208.

Either user connection logic 156 or wave processor instance 122 then ends the user connection instance 108 that the control record was selected in. This is indicated by block 210, and the processing of wave processor instance 122, for that wave, is complete.

If, at block 206, wave processor instance 122 does not complete its task or step, because it has ungracefully or catastrophically failed, then this will cause user connection logic 156 to end the user connection instance 108. This, in turn, causes lock processing logic 160 to remove the pessimistic lock on control record 166. This is indicated by block 212. This will be used, as is described in more detail below with respect to FIG. 3, by a subsequent wave processor instance 126 to determine that wave processor instance 122 failed before completing its task or step.

Figure 3:
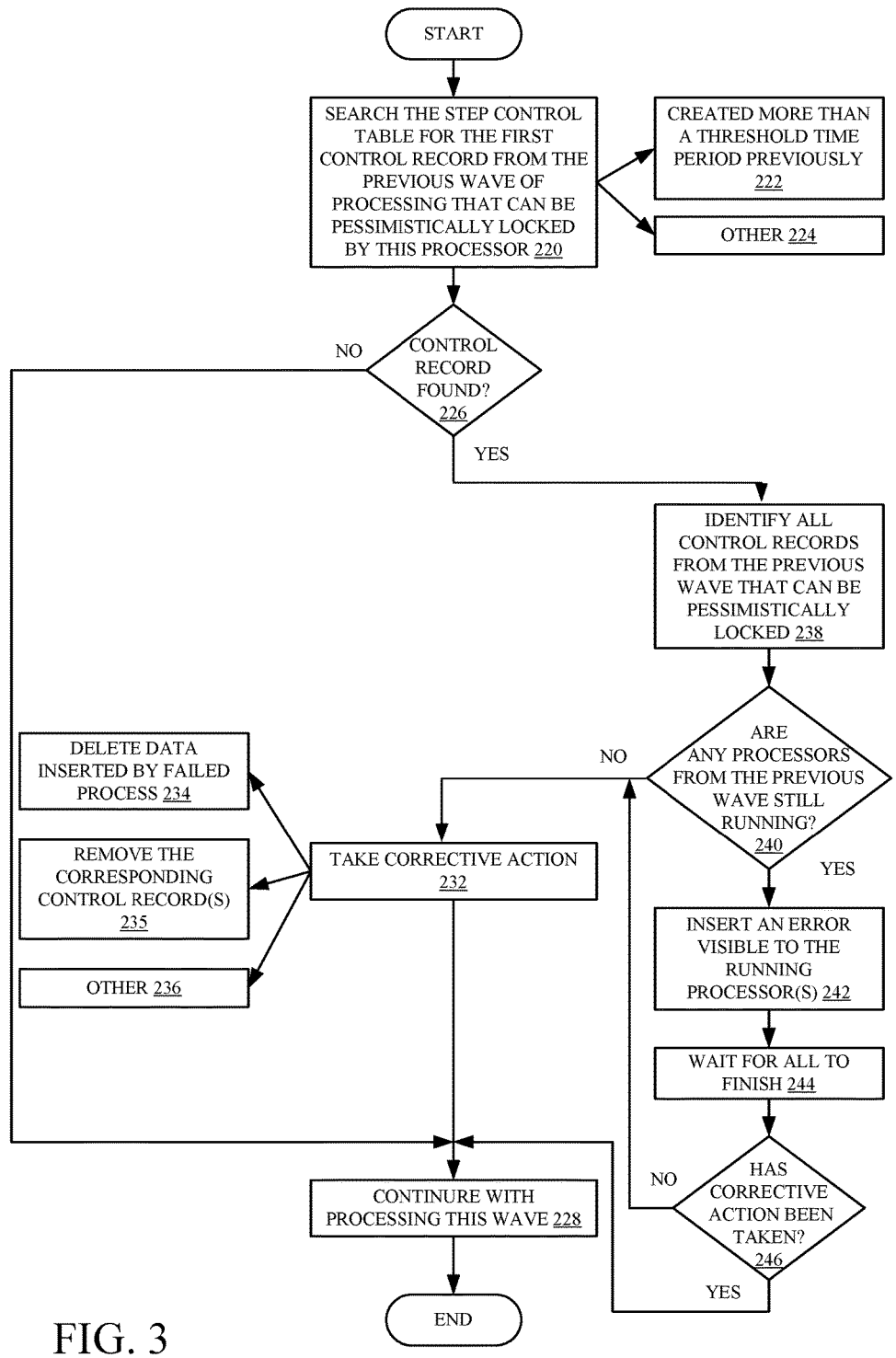
FIG. 3 is a flow diagram illustrating one example of the operation of a processor in performing failure detection to determine whether a processor in a previous wave has failed.

FIG. 3 is a flow diagram illustrating one example of how a wave processor instance (such as wave processor instance 126) performs failure detection (as mentioned above at block 202 in FIG. 2). Thus, for the sake of this discussion, it is assumed that wave processor instance 122 ungracefully failed before completing its assigned task. It is also assumed that wave processor instance 126 has established a user connection and inserted its own control record (e.g., control record 168) in step control table 164 and then selected it and asserted a pessimistic lock on that control record 168. Then, again referring to block 200 in FIG. 2, wave processor instance 126 determines that there was a previous wave of processing. Thus, it begins to perform failure detection as indicated by block 202 in FIG. 2.

Referring now to FIG. 3, wave processor instance 126 first uses CRUD logic 158 to search step control table 164 for a first control record (e.g., control record 166) that was inserted during the previous wave of processing, which can be pessimistically locked by wave processor instance 126. This is indicated by block 220 in FIG. 3. Recall that, because wave processor instance 122 ungracefully failed, lock processing logic 160 detected that its user connection instance (that it used to select and lock control record 166) has ended, and it therefore removed the pessimistic lock on control record 166. However, control record 166 is still in the step control table because it was not deleted by processor instance 122. Thus, CRUD logic 158 will return the identity of control record 166 as a first record in step control table 164 that belongs to a previous wave, and that can be pessimistically locked by wave processor instance 126, from the subsequent wave.

In one scenario, there may be a slight delay between the time that a wave processor instance (e.g., wave processor instance 122) inserts a control record (such as control record 166) in step control table 164 and the time when it selects and pessimistically locks that record. Therefore, in one example, when wave processor instance 126 begins its failure detection, it requests CRUD logic 158 to return only the first record from a previous wave that it can pessimistically lock, that was inserted more than a threshold time period previously. This is indicated by block 222. For instance, it may request the first control record, in step control table 164, that was inserted by a processor instance in a previous wave more than ten seconds ago. Of course, ten seconds is only one example and a wide variety of other time thresholds can be used as well. By waiting a threshold time period, this will increase the likelihood that any latency between any previous wave processor instance inserting a control record and then selecting and locking it will have lapsed.

Searching the step control table 164 for the first control record that it can pessimistically lock can be done in other ways as well. This is indicated by block 224.

If no such control record is found in step control table 164, then this means that none of the wave processor instances 122-124, from a previous wave, have failed. Thus, wave processor instance 126 can continue to perform its task or step in its wave. This is indicated by blocks 226 and 228 in the flow diagram of FIG. 3.

However, in the present scenario being discussed, CRUD logic 158 will identify control record 166 as having been inserted by a processor instance in a previous wave, and that can be pessimistically locked by wave processor instance 126. It may be that there was only a single wave processor instance 122 operating in the previous wave, and that it failed. However, there may have been more than one processor instance operating in the previous wave. Thus, processor instance 126 requests CRUD logic 158 to return all control records, inserted by wave processor instances from the previous wave, and to identify those that instance 126 can pessimistically lock. This is indicated by block 238 in the flow diagram of FIG. 3. In this way, wave processor instance 126 can determine whether any of the other wave processor instances 122-124 operating in the previous wave are still running or whether any of them have also failed.

For example, if, instance 126 determines that there were five processor instances running in the previous wave, and, at step 238, CRUD logic 158 returns three control records that processor instance 126 can pessimistically lock, this means that at least three of the processor instances operating in the previous wave have failed. However, even at that point, processor instance 126 may not need to take any corrective action. It may be, for instance, that there are still processor instances from the previous wave running, and they may, themselves, take corrective action if they know that any other of the processor instances in that wave have failed.

Thus, processor instance 126 then determines whether any of the processor instances operating in the previous wave are still running. This is indicated by block 240 in FIG. 3. It can do this in a variety of different ways. For instance, it can request CRUD logic 158 to identify any control records in step control table 164 that were inserted by processor instances in the previous wave, but that cannot be pessimistically locked by processor instance 126. This means that the corresponding processor instance that inserted the control record is still running, has not yet completed its operation, and has not yet failed. If it had failed, the control record could be pessimistically locked by processor instance 126. If it had completed its operation, then the control record would have been deleted. Thus, if the control record is still present, but cannot be pessimistically locked, this means that the processor instance that inserted it is still running, and has not failed.

If, at block 240, processor instance 126 determines that none of the processor instances from the previous wave are still running, then processing continues at block 232, where it takes corrective action. Wave processor instance 126 can take corrective action immediately, in order to clean up any data records or any other operational remnants or other traces of the previous operation that need to be cleaned up before the next wave of processing can continue. In one example, it deletes all data inserted into data store 140, or any other data store, by the failed processor instance 122. This is indicated by block 234. The corrective action may also include removing the corresponding control record from step control table 164. This is indicated by block 235. This will show to other processor instances that the corrective action for the failed processor instance has already been taken. It can take corrective action in a wide variety of other ways as well, and this is indicated by block 236. The particular corrective action that is to be taken may vary widely, depending on the particular application that the wave processing is being performed in, or for other reasons.

However, if, at block 240, processor instance 126 has identified one or more processor instances operating in the previous wave that have failed, but has also identified that one or more of the processor instances from the previous wave are still running, then it inserts an error indicator in the control records for the processor instances that have failed, that is visible to the other running processor instances operating in the previous wave. This is indicated by block 242 in the flow diagram of FIG. 3.

In one example, wave processor instance 126 can mark the control records inserted by the failed processor instances (e.g., it can mark control record 166) with an error indicator indicating that its corresponding processor instance has failed before completing its operation. Because control record 166 is still visible by other processor instances, then the other processor instance 124 in the previous wave will be able to detect this and take corrective action, on its own, so that processor instance 126 from the next wave need not do that.

Once processor instance 126 has marked control record 166 with an error indicator, it waits for all of the processor instances operating in the previous wave to finish their operations. This is indicated by block 244. It can do this by periodically checking step control table 164, as described above, for control records that were inserted by processor instances of the previous wave, but that cannot be pessimistically locked by processor instance 126.

Once all the processor instances from the previous wave have finished their operations, then processor instance 126 can check to determine whether corrective action has been taken by one of them. This is indicated by block 246. For instance, it can again check to determine whether the corresponding control records from the failed processor instances have now been removed from step control table 164. If not, this means that corrective action has not yet been taken and, again, processing reverts to block 232 where processor instance 126 will take corrective action.

However, if, at block 246, processor instance 126 determines that corrective action has already been taken, then it can continue with its processing for its current wave. This is indicated by block 228.

It can thus be seen that the present discussion provides a highly technical solution to a particularly technical problem. In wave processing scenarios, the results of a failure in a previous wave, on the operations of a subsequent wave, may be significant. However, it is very difficult to determine whether a processor instance operating in a previous wave has failed. Thus, it can be difficult to determine the particular state of a processor instance operating in a previous wave (e.g., whether it is running, has completed successfully, or has failed ungracefully). The present discussion indicates that the processor instances operating in the wave processing scenario take advantage of lock processing features in the database to make this determination, so that they can take corrective action. This not only greatly enhances the accuracy of the wave processing operation, but it also greatly improves the efficiency of the computing system itself. The system need not start batch processing over, when it finally discovers that a processor instance has failed. Instead, this is discovered by a subsequent processor instance, operating in a subsequent wave, so that remedial or corrective action can be taken before any further batch processing occurs. All of this greatly enhances the accuracy and efficiency of the computing system in performing wave processing.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
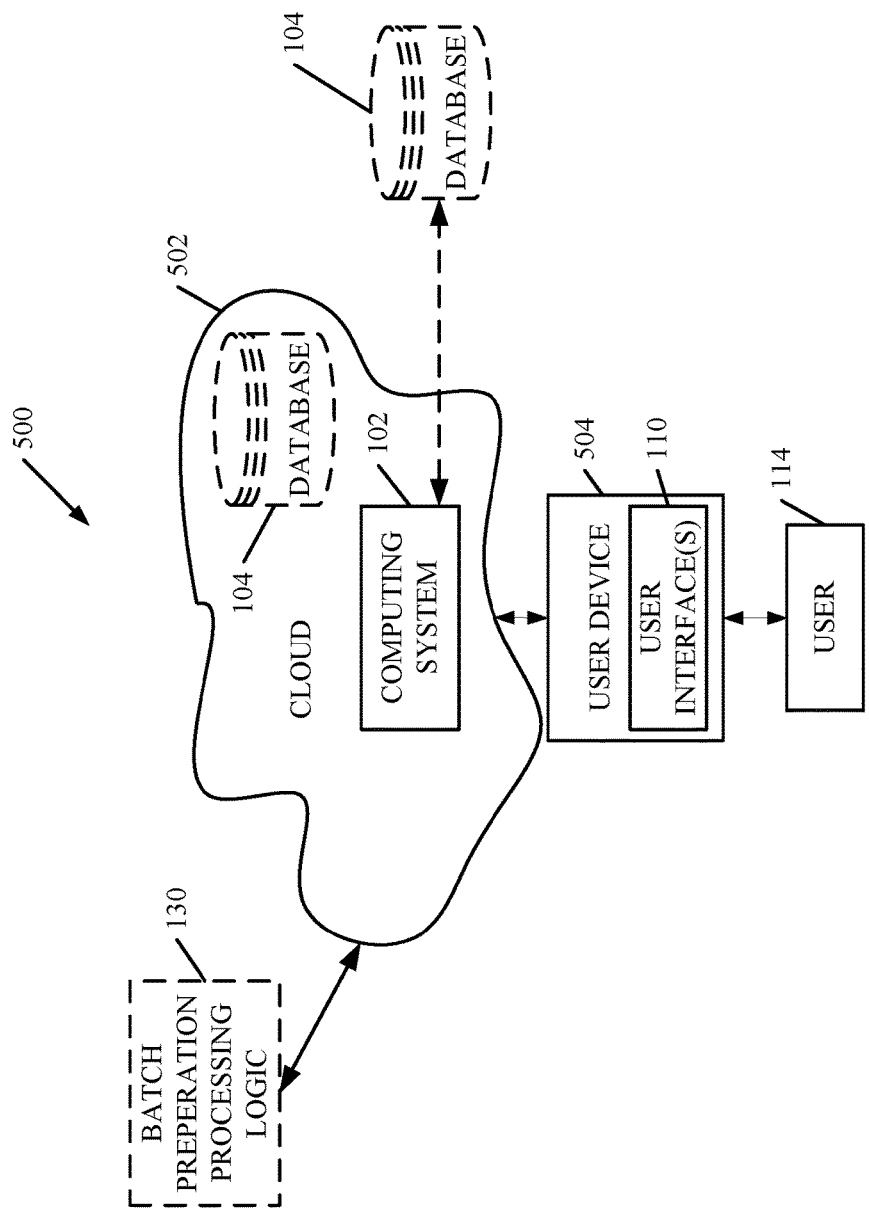
FIG. 4 is a block diagram showing one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 and database 104 can be in cloud 502 (which can be public, private, or a combination where portions are public while others are private). Therefore, user 114 uses a user device 504 to access those systems through cloud 502.

FIG. 4 also depicts another example of a cloud architecture. FIG. 4 shows that it is also contemplated that some elements of architecture 102 can disposed in cloud 502 while others are not. By way of example, data store 104 can be disposed outside of cloud 502, and accessed through cloud 502. In another example, batch preparation processing logic 130 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
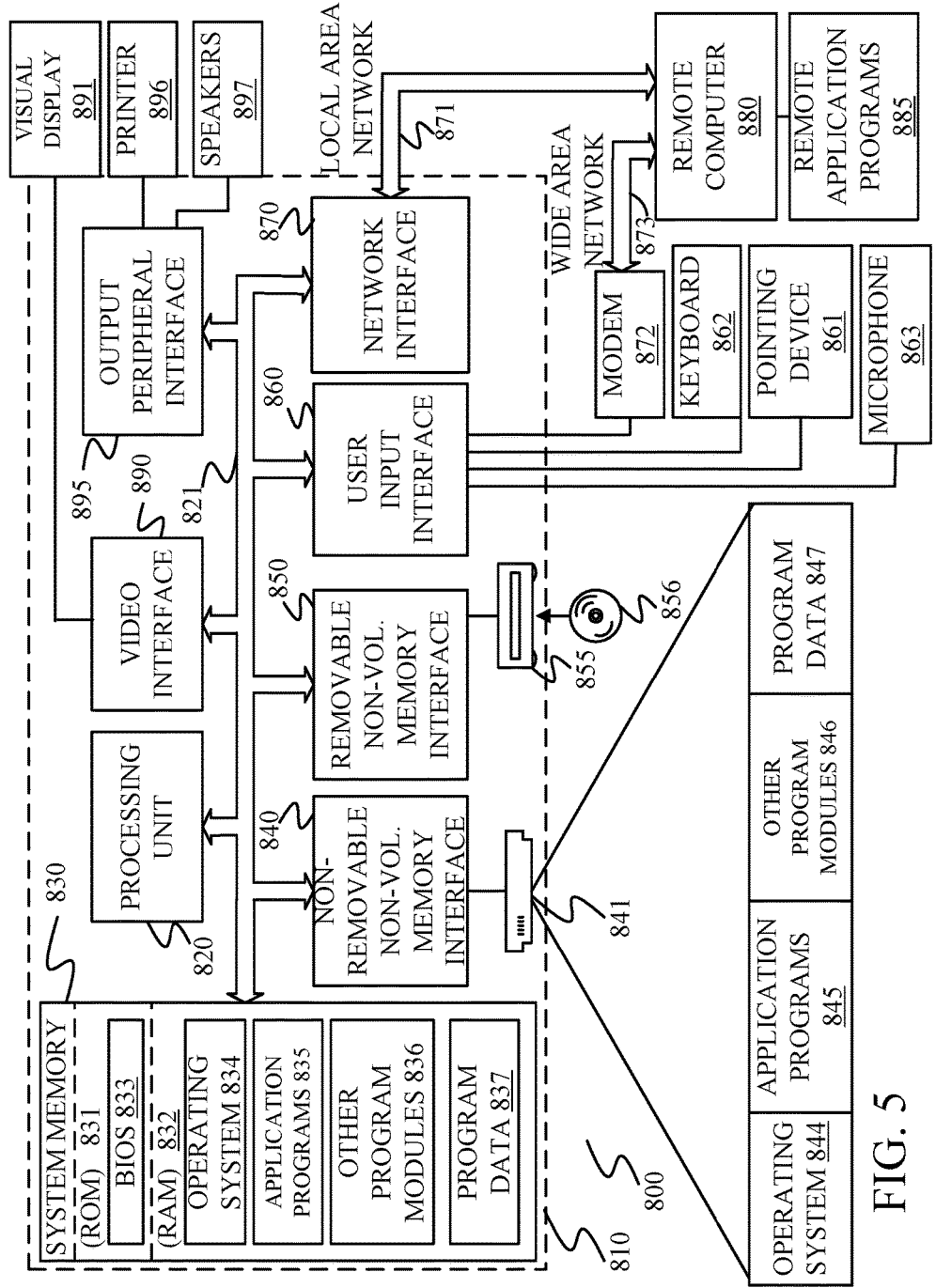
FIG. 5 is a block diagram showing one example of a computing environment that can be used in the architectures shown in the previous figures.

FIG. 5 is one example of a computing environment in which architecture 100, or parts of it, (for example) can be deployed. With reference to FIG. 5, an example system for implementing some embodiments includes a general-purpose computing device in the form of a computer 810. Components of computer 810 may include, but are not limited to, a processing unit 820 (which can comprise processors or servers 116), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 5 illustrates remote application programs 885 as residing on remote computer 880. It will be appreciated that the network connections shown are exemplary and other means of establishing a communications link between the computers may be used.

A first example includes a computing system, comprising:

batch processing logic that identifies a first task to be performed by a first processor instance and a second task to be performed, the second task being performed after the first task; and a second processor instance, configured to perform the second task, identifying a failure state of the first processor instance as failed by identifying, in a step control table, that a first control record inserted by the first processor instance is pessimistically lockable in the step control table by the second processor instance.

Another example includes the computing system of any or all previous examples wherein the first processor instance is configured to, before performing the first task, insert the first control record into the step control table and then select the first control record and assert a pessimistic lock on the first control record until the first processor instance completes the first task, the pessimistic lock precluding the second processor instance from pessimistically locking the first control record.

Another example includes the computing system of any or all previous examples wherein the first processor instance is configured to delete the first control record from the step control table after successfully performing the first task.

Another example includes the computing system of any or all previous examples wherein the first processor instance is configured to select the first control record and assert the pessimistic lock on the first control record over a first user connection instance.

Another example includes the computing system of any or all previous examples and further comprising:

user connection logic that ends the first user connection instance if the first processor instance fails, ungracefully, to perform the first task.

Another example includes the computing system of any or all previous examples and further comprising:

lock processing logic that detects ending of the first user connection and, in response, removes the pessimistic lock from the first control record.

Another example includes the computing system of any or all previous examples wherein the first processor instance is configured to insert the first control record into the step control table over a second user connection, different from the first user connection.

Another example includes the computing system of any or all previous examples wherein the first processor instance operates in a first wave and the second processor instances operates in a second wave, after the first wave, and wherein second processor instance is configured to, after detecting the failure state of the first processor instance as failed, determine whether any additional processor instances are in the first wave and, if so, determine whether any of the additional processor instances have failed by attempting to pessimistically lock any additional control records in the step control table that were inserted by corresponding ones of the additional processor instances in the first wave.

Another example includes the computing system of any or all previous examples wherein the second processor instance is configured to determine whether any of the additional processor instances are still running by identifying any of the additional control records in the step control table that the second processor instance cannot pessimistically lock.

Another example includes the computing system of any or all previous examples wherein the second processor instance is configured to, if any of the additional processor instances are still running, insert in control records corresponding to any failed processor instances, an error indicator that is accessible by any of the processor instances still running.

Another example includes the computing system of any or all previous examples wherein the second processor instance is configured to, if any of the additional processor instances are still running, wait to perform any corrective action, to correct for any failed processor instances in the first wave, until the running processor instances have finished running, and then determine whether corrective action is needed.

Another example includes a computer implemented method, comprising:

identifying a first task to be performed by a first processor instance;

identifying a second task to be performed by a second processor instance the second task being performed after the first task;

before performing the second task, attempting, with the second processor instance, to pessimistically lock a first control record inserted by the first processor instance in a control table; and if the second processor instance can pessimistically lock the first control record, then determining, with the second processor instance, that the first processor instance has failed to successfully perform the first task.

Another example includes the computer implemented method of any or all previous examples and further comprising:

prior to performing the first task:

inserting, with the first processor instance, the first control record into the control table;

selecting the first control record with the first processor instance; and asserting a pessimistic lock on the first control record until the first processor instance completes the first task, the pessimistic lock precluding the second processor instance from pessimistically locking the first control record.

Another example includes the computer implemented method of any or all previous examples and further comprising:

deleting the first control record from the step control table, with the first processor instance, after the first processor instance successfully performs the first task.

Another example includes the computer implemented method of any or all previous examples and further comprising:

selecting the first control record and asserting the pessimistic lock on the first control record over a first user connection instance; and ending the first user connection instance if the first processor instance fails, ungracefully, to perform the first task.

Another example includes the computer implemented method of any or all previous examples and further comprising:
    detecting the ending of the first user connection; and
    in response, removing the pessimistic lock from the first control record.

Another example includes the computer implemented method of any or all previous examples wherein the first processor instance performs the first task in a first wave of processing and the second processor performs the second task in a second wave of processing, after the first wave of processing and further comprising:
    after detecting the failure state of the first processor instance as failed, determining, with the second processor instance, whether any additional processor instances are in the first wave of processing; and
        if so:
        determining, with the second processor instance, whether any of the additional processor instances have failed by attempting to pessimistically lock any additional control records in the step control table that were inserted by corresponding ones of the additional processor instances in the first wave of processing;
        determining, with the second processor instance, whether any of the additional processor instances are still running by identifying any of the additional control records in the step control table that the second processor instance cannot pessimistically lock; and
        if any of the additional processor instances are still running, inserting, with the second processor instance, in control records corresponding to any failed processor instances, an error indicator that is accessible by any of the processor instances still running; and
        waiting to perform any corrective action with the second processor instance, to correct for any failed processor instances in the first wave or processing, until the running processor instances have finished running, and then determine whether corrective action is needed.

Another example includes a computing system, comprising:
    batch processing logic that identifies a first task to be performed by a first processor instance in a first wave of processing and a second task to be performed in a second wave of processing, the second task in the second wave of processing being performed after the first task in the first wave of processing, the first processor instance being configured to, before performing the first task, insert a first control record into a step control table and then select the first control record and assert a pessimistic lock on the first control record over a first user connection instance until the first processor instance completes the first task, the pessimistic lock precluding other processor instances from pessimistically locking the first control record, the first processor instance being further configured to delete the first control record from the step control table after successfully performing the first task;
    user connection logic that ends the first user connection instance if the first processor instance fails, ungracefully, to perform the first task;
    lock processing logic that detects ending of the first user connection and, in response, removes the pessimistic lock from the first control record; and
    a second processor instance, configured to perform the second task in the second wave of processing, identifying a failure state of the first processor instance as failed by identifying, in the step control table, that the first control record inserted by the first processor instance is pessimistically lockable in the step control table by the second processor instance.

Another example includes the computing system of any or all previous examples wherein the second processor instance is configured to, after detecting the failure state of the first processor instance as failed, determine whether any additional processor instances are in the first wave of processing and, if so, determine whether any of the additional processor instances have failed by attempting to pessimistically lock any additional control records in the step control table that were inserted by corresponding ones of the additional processor instances in the first wave of processing.

Another example includes the computing system of any or all previous examples wherein the second processor instance is configured to determine whether any of the additional processor instances are still running by identifying any of the additional control records in the step control table that the second processor instance cannot pessimistically lock, and if any of the additional processor instances are still running, insert in control records corresponding to any failed processor instances, an error indicator that is accessible by any of the processor instances still running.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    batch processing logic configured to:
        identify a first task to be performed by a first processor instance, and
        identify a second task to be performed after the first task: and
    a second processor instance executed on a hardware processor, and configured to:
        perform the second task;
        identify a first control record that is associated with the first task and inserted in a step control table by the first processor instance; and
        based on a determination that the first control record is pessimistically lockable in the step control table by the second processor instance,
            identify a failure state that indicates the first processor instance as failed.

2. The computing system of claim 1 wherein the first processor instance is configured to:
    before performing the first task, insert the first control record into the step control table;
    after inserting the first control record, select the first control record and assert a pessimistic lock on the first control record until the first processor instance completes the first task, the pessimistic lock precluding the second processor instance from pessimistically locking the first control record.

3. The computing system of claim 2 wherein the first processor instance is configured to delete the first control record from the step control table after successfully performing the first task.

4. The computing system of claim 3 wherein the first processor instance is configured to select the first control record and assert the pessimistic lock on the first control record over a first user connection instance.

5. The computing system of claim 4 and further comprising:
user connection logic configured to end the first user connection instance if the first processor instance fails, ungracefully, to perform the first task.

6. The computing system of claim 5 and further comprising:
lock processing logic configured to detect ending of the first user connection and, in response, remove the pessimistic lock from the first control record.

7. The computing system of claim 6 wherein the first processor instance is configured to insert the first control record into the step control table over a second user connection, different from the first user connection.

8. The computing system of claim 6 wherein the first processor instance operates in a first wave and the second processor instances operates in a second wave, after the first wave, and wherein the second processor instance is configured to:
after detecting the failure state of the first processor instance as failed, determine whether any additional processor instances are in the first wave; and
if there are any additional processor instances in the first wave, determine whether any of the additional processor instances have failed by attempting to pessimistically lock any additional control records in the step control table that were inserted by corresponding ones of the additional processor instances in the first wave.

9. The computing system of claim 8 wherein the second processor instance is configured to determine whether any of the additional processor instances are still running by identifying any of the additional control records in the step control table that the second processor instance cannot pessimistically lock.

10. The computing system of claim 9 wherein the second processor instance is configured to, if any of the additional processor instances are still running, insert in control records corresponding to any failed processor instances, an error indicator that is accessible by any of the processor instances still running.

11. The computing system of claim 10 wherein the second processor instance is configured to, if any of the additional processor instances are still running, wait to perform any corrective action, to correct for any failed processor instances in the first wave, until the running processor instances have finished running, and then determine whether corrective action is needed.

12. A computer implemented method, comprising:
identifying a first task to be performed by a first processor instance;
identifying a second task to be performed by a second processor instance, the second task being performed after the first task;
before performing the second task, attempting, with the second processor instance, to pessimistically lock a first control record inserted by the first processor instance in a control table; and
if the second processor instance can pessimistically lock the first control record, then determining, with the second processor instance, that the first processor instance has failed to successfully perform the first task.

13. The computer implemented method of claim 12 and further comprising:
prior to performing the first task:
inserting, with the first processor instance, the first control record into the control table;
selecting the first control record with the first processor instance; and
asserting a pessimistic lock on the first control record until the first processor instance completes the first task, the pessimistic lock precluding the second processor instance from pessimistically locking the first control record.

14. The computer implemented method of claim 13 and further comprising:
deleting the first control record from the step control table, with the first processor instance, after the first processor instance successfully performs the first task.

15. The computer implemented method of claim 14 and further comprising:
selecting the first control record and asserting the pessimistic lock on the first control record over a first user connection instance; and
ending the first user connection instance if the first processor instance fails, ungracefully, to perform the first task.

16. The computer implemented method of claim 15 and further comprising:
detecting the ending of the first user connection; and
in response, removing the pessimistic lock from the first control record.

17. The computer implemented method of claim 16 wherein the first processor instance performs the first task in a first wave of processing and the second processor performs the second task in a second wave of processing, after the first wave of processing and further comprising:
after detecting the failure state of the first processor instance as failed, determining, with the second processor instance, whether any additional processor instances are in the first wave of processing; and
if so:
determining, with the second processor instance, whether any of the additional processor instances have failed by attempting to pessimistically lock any additional control records in the step control table that were inserted by corresponding ones of the additional processor instances in the first wave of processing;
determining, with the second processor instance, whether any of the additional processor instances are still running by identifying any of the additional control records in the step control table that the second processor instance cannot pessimistically lock; and
if any of the additional processor instances are still running, inserting, with the second processor instance, in control records corresponding to any failed processor instances, an error indicator that is accessible by any of the processor instances still running: and
waiting to perform any corrective action with the second processor instance, to correct for any failed processor instances in the first wave of processing, until the running processor instances have finished running, and then determine whether corrective action is needed.

18. A computing system, comprising:

batch processing logic configured to:
- identify a first task to be performed by a first processor instance in a first wave of processing; and
- identify a second task to be performed in a second wave of processing, the second task in the second wave of processing being performed after the first task in the first wave of processing, the first processor instance being configured to:
- before performing the first task, insert a first control record into a step control table;
- after inserting the first control record, select the first control record and assert a pessimistic lock on the first control record over a first user connection instance until the first processor instance completes the first task, the pessimistic lock precluding other processor instances from pessimistically locking the first control record; and
- delete the first control record from the step control table after successfully performing the first task;

user connection logic configured to end the first user connection instance if the first processor instance fails, ungracefully, to perform the first task;

lock processing logic configured to detect ending of the first user connection and, in response, remove the pessimistic lock from the first control record; and a second processor instance executed on a hardware processor, and configured to:
- perform the second task in the second wave of processing;
- identify a failure state of the first processor instance as failed by identifying, in the step control table, that the first control record inserted by the first processor instance is pessimistically lockable in the step control table by the second processor instance; and
- after detecting the failure state of the first processor instance as failed, determine whether any additional processor instances are in the first wave of processing and if so, determine whether any of the additional processor instances have failed by attempting to pessimistically lock any additional control records in the step control table that were inserted by corresponding ones of the additional processor instances in the first wave of processing.

19. The computing system of claim 18 wherein the second processor instance is configured to determine whether any of the additional processor instances are still running by identifying any of the additional control records in the step control table that the second processor instance cannot pessimistically lock, and if any of the additional processor instances are still running, insert in control records corresponding to any failed processor instances, an error indicator that is accessible by any of the processor instances still running.

* * * * *